United States Patent
Hiraga et al.

(10) Patent No.: US 6,777,501 B1
(45) Date of Patent: Aug. 17, 2004

(54) STABILIZED FLUORINE-CONTAINING POLYMER AND METHOD FOR STABILIZING FLUORINE CONTAINING POLYMER

(75) Inventors: Yoshiyuki Hiraga, Settsu (JP); Satoshi Komatsu, Settsu (JP); Tomohisa Noda, Settsu (JP); Masayuki Namimatsu, Settsu (JP); Hiroyuki Imanishi, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/623,756

(22) PCT Filed: Mar. 9, 1999

(86) PCT No.: PCT/JP99/01120

§ 371 (c)(1),
(2), (4) Date: Sep. 8, 2000

(87) PCT Pub. No.: WO99/46307

PCT Pub. Date: Sep. 16, 1999

(30) Foreign Application Priority Data

Mar. 9, 1998 (JP) .......................................... 10/056631

(51) Int. Cl.⁷ ................................................ C08F 8/00
(52) U.S. Cl. ............................... 525/326.2; 525/326.4; 525/366; 525/367; 525/368; 525/369; 525/378
(58) Field of Search ........................... 525/326.2, 326.4, 525/378, 366, 367, 368, 369

(56) References Cited

U.S. PATENT DOCUMENTS

| | | | | |
|---|---|---|---|---|
| 2,946,763 A | * | 7/1960 | Bro et al. ..................... | 525/199 |
| 3,085,083 A | * | 4/1963 | Scrreyer ................... | 525/326.2 |
| 3,674,758 A | * | 7/1972 | Carison ....................... | 525/384 |
| 3,969,435 A | * | 7/1976 | Bailey et al. ................ | 525/199 |
| 4,001,351 A | * | 1/1977 | Roura ......................... | 525/197 |
| 4,599,386 A | | 7/1986 | Carlson et al. | |
| 4,743,658 A | | 5/1988 | Imbalzano et al. | |
| 4,946,902 A | | 8/1990 | Bekiarian et al. | |
| 5,180,803 A | | 1/1993 | Gibbard | |
| 5,861,464 A | * | 1/1999 | Goldmann et al. ...... | 525/326.4 |
| 2002/0099146 A1 | * | 7/2002 | Hiraga et al. ............ | 525/326.4 |

FOREIGN PATENT DOCUMENTS

| | | |
|---|---|---|
| EP | 0469759 A1 | 2/1992 |
| JP | 5566942 | 5/1980 |
| JP | 60240713 | 11/1985 |
| JP | 6198709 | 5/1986 |
| JP | A61098709 | 5/1986 |
| JP | A62104822 | 5/1987 |
| JP | 62104822 | 5/1987 |
| JP | A3500547 | 2/1991 |
| JP | 3500547 | 2/1991 |
| JP | A3504735 | 10/1991 |
| JP | 3504735 | 10/1991 |
| JP | A5148312 | 6/1993 |
| JP | 5148312 | 6/1993 |
| WO | WO8912240 | 12/1989 |
| WO | WO 98/09784 | * 3/1998 |

* cited by examiner

*Primary Examiner*—Bernard Lipman
(74) *Attorney, Agent, or Firm*—Birch, Stewart, Kolasch & Birch, LLP

(57) ABSTRACT

To a fluorine-containing polymer, 0.1 to 10% of a compound comprising an alkali metal or an alkaline earth metal in terms of the number of atoms of the alkali metal or the alkaline earth metal based on the total number of the above terminal groups, 0.1 to 10% of ammonia in terms of the number of ammonia molecules based on the total number of the above terminal groups, or 0.1 to 10% of a compound having an ammonium group in terms of the number of the ammonium groups based on the total number of the above terminal groups is added, and heated at a temperature of at least 2000C in an atmosphere containing moisture. By this process, unstable terminal groups such as terminal carboxylic acid groups and coloration caused by such terminal groups are effectively removed from the fluorine-containing polymer, and furthermore unstable bonds in the backbones can be removed. The obtained fluorine-containing polymer contains $1.0 \times 10^{13}$ spins/g or less of unpaired electrons on the carbon atoms in terms of a spin density measured with spin resonance at a temperature of 10K.

4 Claims, No Drawings

STABILIZED FLUORINE-CONTAINING POLYMER AND METHOD FOR STABILIZING FLUORINE CONTAINING POLYMER

This application is the national phase under 35 U.S.C. § 371 of PCT International Application No. PCT/JP99/01120 which has an International filing date of Mar. 9, 1999, which designated the United States of America.

FIELD OF THE INVENTION

The present invention relates to a stabilized fluorine-containing polymer and a method for stabilizing a fluorine-containing polymer. In particular, the present invention relates to a stabilized fluorine-containing polymer which can prevent brown or grayish brown coloration of a fluorine-containing polymer having a terminal carboxylic acid group and/or a terminal group that generates the terminal carboxylic acid group on heating, and avoid foaming, and a method for stabilizing a fluorine-containing polymer to obtain such a stabilized fluorine-containing polymer.

BACKGROUND OF THE INVENTION

For example, when the emulsion polymerized copolymer of tetrafluoroethylene and hexafluoropropylene is melt processed to obtain a final product, the final product may have bubbles or voids formed with volatile materials due to polymer chain ends which are unstable against heat and shear force.

The kinds of unstable polymer chain end groups vary with polymerization methods, and the kinds of polymerization initiators and chain transfer agents. For example, when a commonly used peracid salt (e.g. ammonium persulfate, potassium persulfate, etc.) is used as a polymerization initiator in the emulsion polymerization, terminal carboxylic acid groups are formed, and function as the source of volatile materials in the course of melt processing. In some cases, olefinic groups ($—CF=CF_2$), acid fluoride groups ($—COF$), etc. may be formed at the polymer chain ends depending on the condition of the melt processing. Such terminal groups may also cause bubbles or voids in the final products.

To remove such unstable terminal groups, U.S. Pat. No. 3,085,083 proposes the wet thermal treatment. However, the wet thermal treatment accelerates the treating speed by the addition of a salt or a base, and the concentration of the salt or the base is from 100 to 600 ppm. However, such a concentration is not set to aim at the unstable terminal group.

For example, the copolymer of tetrafluoroethylene and hexafluoropropylene prepared by the emulsion polymerization may be colored brown or grayish brown during the melt processing to obtain the final products. The causes for such coloration include the severity of the melting conditions, the residues of the polymerization initiators, the presence of contamination, carbonization of low molecular weight materials, etc.

The above-described problems of the formation of bubbles or voids and the coloration can be solved by the fluorination described in U.S. Pat. No. 4,626,587. However, when fluorine is used for the fluorination, some drawbacks such as the increase of the costs and the large scale measures to prevent environmental contamination are not avoided.

DISCLOSURE OF THE INVENTION

One object of the present invention is to provide a stabilized fluorine-containing polymer from which unstable terminal groups are removed, and which is not bubbled on heating.

Another object of the present invention is to provide a method which can effectively remove the unstable terminal group and the coloration caused by the unstable terminal groups from a fluorine-containing polymer having unstable terminal groups such as terminal carboxylic acid groups, and optionally remove unstable bonds in the backbones of such a polymer.

According to the first aspect of the present invention, there is provided a melt formed fluorine-containing polymer containing $1.0 \times 10^{14}$ spins/g or less of unpaired electrons on the carbon atoms in terms of a spin density measured with electron spin resonance at a temperature of 10K, and preferably containing 50 ppm or less of a basic component.

According to the second aspect of the present invention, there is provided a method for stabilizing a fluorine-containing polymer having terminal carboxylic acid groups or terminal groups that generate the terminal carboxylic acid groups on heating at a temperature of at least 200° C. comprising the steps of:

adding 0.1 to 10% of a compound comprising an alkali metal or an alkaline earth metal in terms of the number of atoms of the alkali metal or the alkaline earth metal based on the total number of the above terminal groups, 0.1 to 10% of ammonia in terms of the number of ammonia molecules based on the total number of the above terminal groups, or 0.1 to 10% of a compound having an ammonium group in terms of the number of the ammonium groups based on the total number of the above terminal groups to the fluorine-containing polymer, and heating the fluorine-containing polymer at a temperature of at least 200° C. in an atmosphere containing moisture.

DETAILED DESCRIPTION OF THE INVENTION

In the stabilized fluorine-containing polymer of the present invention, the amount of the unpaired electrons on the carbon atoms is $1.0 \times 10^{14}$ spins/g or less, preferably $1.0 \times 10^{13}$ spins/g or less in terms of a spin density measured with the electron spin resonance (ESR) at a temperature of 10K. When the spin density is in the above range, the fluorine-containing polymer is not or hardly colored on heating.

When the fluorine-containing polymer is heated, the degree of coloration depends on the severity of the melting conditions, the residues of the polymerization initiators, and the presence of contamination. The primary cause for the coloration may be assumed to be carbon atoms which appear in the polymer at a temperature of at least 200° C. When the unpaired electrons on the carbon atoms of the samples of fluorine-containing polymers having different degrees of coloration are measured with ESR, a good correlation is present between the degree of coloration and the unpaired electrons (spin density). Thus, the above assumption seems to be justified.

The stabilized fluorine-containing polymer of the present invention preferably contains 50 ppm or less, more preferably 25 ppm or less of a basic component, for example, a compound comprising an alkali metal or an alkaline earth metal, ammonia, a compound having an ammonium group, which are used in the stabilization method of the present invention.

When the amount of the base compound is in the above range, the amount of carbon atoms which may be a cause of the coloration can be reduced while performing the terminal-stabilizing reaction.

In the method for stabilizing the fluorine-containing polymer according to the present invention, the compound comprising the alkali metal or the alkaline earth metal, ammonia or the compound having the ammonium group is added to the fluorine-containing polymer when the polymer is heated.

As the compounds comprising the alkali metal or the alkaline earth metal, the hydroxides or salts (e.g. carbonate, sulfate, etc.) of such metals can be used, and as the compounds having the ammonium group, ammonium hydroxide can be used. Preferable examples include potassium hydroxide, sodium hydroxide, potassium carbonate, potassium sulfate, calcium carbonate, ammonia, ammonium hydroxide, etc. Ammonia may be used in the gas state or in the form of aqueous ammonia.

The amount of the compound comprising the alkali metal or the alkaline earth metal, ammonia or the compound having the ammonium group depends on the kind of the fluorine-containing polymer to be treated, and the number of the alkali metal or alkaline earth metal atoms, the number of ammonia molecules or the number of ammonium groups is from 0.1 to 10%, preferably from 0.2 to 5% of the total number of the terminal groups. When the amount of the compound comprising the alkali metal or the alkaline earth metal, ammonia or the compound having the ammonium group exceeds 10% of the total number of the terminal groups, the reaction rate to stabilize the terminal groups increases, but the coloration of the polymer may not completely be removed. In addition, the polymer may be deteriorated and the melt viscosity decreases. When the amount of the compound comprising the alkali metal or the alkaline earth metal, ammonia or the compound having the ammonium group is less than 0.1%, the molecular weight of the polymer increases when the method of the present invention is carried out in the molten state of the polymer, or the polymer may hardly be stabilized when the polymer is heated at a temperature lower than the melting point of the polymer.

Examples of the fluorine-containing polymer which is stabilized by the method of the present invention include copolymers of at least two monomers selected from the group consisting of tetrafluoroethylene, hexafluoropropylene, perfluoroalkyl vinyl ethers, ethylene, vinylidene fluoride and chlorotrifluoroethylene, homopolymers of tetrafluoroethylene, homopolymers of vinylidene fluoride, homopolymers of chlorotrifluoroethylene, etc.

Herein, the perfluoroalkyl vinyl ether is a vinyl ether of the formula:

wherein m is an integer of 1 to 6, or

wherein n is an integer of 1 to 4.

When the fluorine-containing polymer to be treated is a tetrafluoroethylene-hexafluoropropylene copolymer (FEP), a copolymer of 72–96 wt. % of tetrafluoroethylene and 4 to 28 wt. % of hexafluoropropylene is preferred. When the fluorine-containing polymer is a tetrafluoroethylene-perfluoroalkyl vinyl ether copolymer (PFA), a copolymer of 92–99 wt. % of tetrafluoroethylene and 1–8 wt. % of perfluoroalkyl vinyl ether copolymer is preferred. When the fluorine-containing polymer is a tetrafluoroethylene-ethylene copolymer (ETFE), a copolymer of 74.5–89.3 wt. % of tetrafluoroethylene and 10.7–25.5 wt. % of ethylene copolymer is preferred.

Those copolymers may comprise other monomer in such an amount that the inherent properties of each copolymer are not impaired. Examples of the other monomer include hexafluoropropylene (when the copolymers do not comprise hexafluoropropylene), perfluoroalkyl vinyl ethers (when the copolymers do not comprise any perfluoroalkyl vinyl ether), ethylene (when the copolymers do not comprise ethylene), vinylidene fluoride (if the copolymers do not comprise vinylidene fluoride), chlorotrifluoroethylene (when the copolymers do not comprise vinylidene fluoride), etc.

Preferably, the fluorine-containing copolymer is prepared by emulsion or suspension polymerization. The fluorine-containing copolymer has a melt viscosity of 0.1 to 100 kPa·s at 372° C. when it is the tetrafluoroethylene-hexafluoropropylene copolymer (FEP), the tetrafluoroethylene-perfluoroalkyl vinyl ether copolymer (PFA) or the tetrafluoroethylene-hexafluoropropylene-perfluoroalkyl vinyl ether copolymer.

The fluorine-containing copolymer, which is stabilized by the method of the present invention, may be either in a dry state or in a wet state. In the case of the wet state, the fluorine-containing copolymer is preferably washed with water until pH of the wash liquor becomes 4 or more. When the copolymer has a high acidity (low pH), the compound comprising the alkali metal or the alkaline earth metal, ammonia or the compound having the ammonium group is consumed in the neutralization reaction, and may not contribute to the expected stabilization of the terminal groups.

When potassium hydroxide is used in the method of the present invention, it reacts with the terminal carboxylic acid groups as follows:

—CF$_2$COOH+KOH→—CF$_2$COOK+H$_2$O→—CF$_2$H+CO$_2$+KOH

That is, potassium hydroxide is regenerated in the course of the reactions, and again reacts with the untreated terminal carboxylic acid group to form the stable terminal group: —CF$_2$H in sequence.

When the terminal groups are treated with ammonia or the compound having the ammonium group, the heating is carried out in a closed reactor, since most of them are gasses.

In the method of the present invention, the heating can be carried out in a melt kneading step. In this case, preferably a residence time is at least 10 minutes, and a kneader is used, which has a usable volume ratio (usable space in a container/space in a container) of at least 0.3 and a power factor K of less than 8,000, when the power factor K is expressed by the following formula:

$$K=Pv/\mu/n^2$$

wherein Pv is a power requirement per unit volume (W/m$^3$), $\mu$ is a melt viscosity (Pa·s) and n is a rotation speed (rps).

In particular, when the copolymers are heated while kneading, the unstable parts in the backbones, which are broken during kneading, are converted to the stable terminal group: —CF$_2$H through the acid fluoride groups or olefinically unsaturated bonds and then the carboxylic acid groups.

The method of the present invention is preferably carried out in the presence of oxygen. As an oxygen source, an air is usually used, although an oxygen gas diluted with an inert gas such as nitrogen, argon, etc. may be used. The concentration of the oxygen gas is not limited, and is usually from 5 to 50 vol. %, preferably from 10 to 30 vol. % of the atmosphere gas.

The oxygen can oxidize the carbons, which are assumed to be the cause for the coloration, and remove the carbons from the U polymers.

The kneader which is preferably used in the method of the present invention is distinguished from conventional twin-screw extruders, since the residence time is longer (at least 10 minutes, preferably 10 to 120 minutes) than that of the conventional ones, and the structure (the usable space, etc.) and the power factor are different from those of the conventional ones.

A so-called "surface renewal type kneader", which is preferably used in the method of the present invention has a usable volume ratio (usable space in a container/space in a container) of at least 0.3, often at least 0.5. Herein, the usable space in the container means the space volume of the container in which paddles, a shaft, etc. are equipped, while the space of the container means the space volume of a kneader in which paddles, a shaft, etc. are not equipped.

Furthermore, the power factor K, which is defined by the above formula, is 8,000 or less, often 7,000 or less for the surface renewal type kneader, while it is from 8,000 to 12,000 for the conventional twin-screw extruder. In addition, the surface renewal type kneader has self-cleaning properties, and also a high piston flow properties in continuous operation.

Typical examples of the surface renewal type kneader are HVR, SCR and NEW-SCR (all manufactured by MITSUBISHI HEAVY INDUSTRIES, LTD.); BIBOLAK (manufactured by SUMITOMO HEAVY MACHINERY AND INDUSTRIES, LTD.); Hitachi EyeGlass Paddle polymerizer and Hitachi Gate Paddle polymerizer (both manufactured by Hitachi Limited), AP-MACHINE and NEW AP-MACHINE (both manufactured by LIST), etc.

The treatment by the method of the present invention removes almost all the unstable terminal groups and/or the unstable bonds in the backbones, and the unstable terminal groups can be converted to stable trifluoromethyl terminal groups ($—CF_3$), difluorohydride terminal groups ($—CF_2H$), acid amide terminal groups ($—CONH_2$), methyl ester terminal groups ($—COOCH_3$), etc.

The amounts of the unstable terminal groups and the stable terminal groups can be quantitatively measured by IR spectroscopy, which is described in U.S. Pat. No. 3,085,083, U.S. Pat. No. 4,675,380 and JP-A-4-20507. The disclosures of these US patents are hereby incorporated by reference. The number of terminal groups can be measured as the number per $10^6$ carbon atoms by this measuring method.

The amount of the materials, which volatilize in the melt processing of polymers, can be assayed by the measurement of a known volatile index: VI. Hereinafter, the measuring method of this VI value is explained.

A sample (10 g) of a polymer is charged in a heat-resistant container, and placed in a glass vessel, which is connected to a vacuum line The glass vessel is evacuated to 2 mmHg or less, and inserted in a high-temperature block kept at 380° C. to achieve the thermal equilibrium.

The pressure change is recorded every 10 minutes over 60 minutes, and then a VI value is calculated according to the following formula:

$$VI=(P_{40}-P_0)\times V/10/W$$

wherein $P_0$ and $P_{40}$ are pressures (mmHg) just after the inserting of the vessel in the high-temperature block and after 40 minutes form the insertion of the vessel in the high-temperature block, respectively, V is the volume (ml) of the vessel, and W is the weight (g) of the sample.

The volatile index is preferably 25 or less. When the volatile index exceeds 25, the bubbles or voids, which cause troubles in the melt processing, are formed.

According to the present invention, the unstable terminal groups of the fluorine-containing polymers are stabilized so that the coloration of the polymers after the melt forming or sintering can be avoided. In some cases, the unstable bonds in the backbones are also stabilized.

EXAMPLES

Example 1

A dispersion of a FEP polymer having a melt viscosity of 2.0 kPa·s and containing 12 mol % of hexafluoropropylene, which was prepared by emulsion polymerization using ammonium persulfate (APS), was coagulated with nitric acid, and then the polymer was dehydrated and dried, followed by the addition of 30 ppm of potassium hydroxide.

The polymer (1 kg) was charged in a kneader made of a corrosion-resistant material and having a usable volume ratio of 0.82 (usable space in a container/space in a container) (internal volume: 1 liter), and kneaded at 50 rpm. The temperature of the kneader was set at 380° C. As soon as the kneading started, saturated wet air heated at 85° C. was supplied at a rate of 0.1 NL/min.

The number of all the terminal carboxylic acid groups of the polymer used in this Example was 850 per $10^6$ carbon atoms, and the number of potassium atoms in potassium hydroxide added to the polymer was about 3% of the number of all the terminal carboxylic acid groups.

The spin density was measured with the ESR measurement at 10K.

The results are shown in Table 1.

When the kneading time was 45 minutes or longer, the melt of the polymer was not colored, and the VI value was low. Here, the coloration was evaluated as follows:

Each sample of the polymer obtained from the kneading treatment was kept standing in a cylinder at 372° C. for 5 minutes to achieve the temperature equilibrium. Then, the polymer sample was extruded through an orifice (diameter: 2.1 mm, length: 8 mm) under a piston load of 5 kg. The heat treatment was repeated three times. Thereafter, the color of the sample was visually evaluated.

TABLE 1

| Kneading time | 0 min. | 15 min. | 30 min. | 45 min. | 60 min. |
|---|---|---|---|---|---|
| Total No. of terminal groups —COOH, —COF, —CF=CF$_2$, etc. (per $10^6$ C) | 850 | 100 | 0 | 0 | 0 |
| Melt viscosity (kPa · s) | 2.0 | 2.1 | 2.0 | 1.9 | 2.1 |
| Coloration | | Brown ←→ Milky white | | | |
| VI | 120 | 45 | 15 | 7.5 | 6 |
| Spin density | | 4.6 × $10^{14}$ | | | 5.0 × $10^{11}$ |

Example 2

The treatment was carried out in the same manner as in Example 1 except that 30 ppm of sodium hydroxide was used in place of potassium hydroxide. The number of sodium atoms in sodium hydroxide added to the polymer was about 4.5% of the number of all the terminal carboxylic acid groups.

The results are shown in Table 2.

When the kneading time was 45 minutes or longer, the melt of the polymer was not colored, and the VI value was low.

TABLE 2

| Kneading time | 0 min. | 15 min. | 30 min. | 45 min. | 60 min. |
|---|---|---|---|---|---|
| Total No. of terminal groups | 850 | 135 | 10 | 0 | 0 |

TABLE 2-continued

| Kneading time | 0 min. | 15 min. | 30 min. | 45 min. | 60 min. |
|---|---|---|---|---|---|
| —COOH, —COF, —CF=CF$_2$, etc. (per 10$^6$ C) | | | | | |
| Melt viscosity (kPa · s) | 2.0 | 2.0 | 2.0 | 1.9 | 2.1 |
| Coloration | | Brown ←→ Milky white | | | |
| VI | 120 | 63 | 21 | 7.5 | 6 |

Comparative Example 1

The treatment was carried out in the same manner as in Example 1 except that the amount of potassium hydroxide was changed to 300 ppm. The number of potassium atoms in potassium hydroxide added to the polymer was about 30% of the number of all the terminal carboxylic acid groups.

The results are shown in Table 3.

The melt viscosity of the polymer decreased, which indicated the degradation of the polymer. Even after 60 minutes kneading, the coloration did no disappear.

TABLE 3

| Kneading time | 0 min. | 15 min. | 30 min. | 45 min. | 60 min. |
|---|---|---|---|---|---|
| Total No. of terminal groups —COOH, —COF, —CF=CF$_2$, etc. (per 10$^6$ C) | 850 | 55 | 0 | 0 | 0 |
| Melt viscosity (kPa · s) | 2.0 | 1.8 | 1.6 | 1.4 | 1.2 |
| Coloration | | Dark brown ←→ Brown | | | |
| VI | 120 | 41 | 12 | 6.8 | 6 |

Comparative Example 2

The treatment was carried out in the same manner as in Example 1 except that the amount of potassium hydroxide was changed to 0.3 ppm. The number of potassium atoms in potassium hydroxide added to the polymer was about 0.03% of the number of all the terminal carboxylic acid groups.

The results are shown in Table 4.

The molecular weight increased as the kneading time was prolonged.

TABLE 4

| Kneading time | 0 min. | 15 min. | 30 min. | 45 min. | 60 min. |
|---|---|---|---|---|---|
| Total No. of terminal groups —COOH, —COF, —CF=CF$_2$, etc. (per 10$^6$ C) | 850 | 250 | 35 | 0 | 0 |
| Melt viscosity (kPa · s) | 2.0 | 5.0 | 12.5 | 20 | 32 |
| Coloration | | Brown ←→ Milky white | | | |
| VI | 120 | 68 | 35 | 8.5 | 8 |

Example 3

In a 3 liter autoclave, the same polymer as that used in Example 1 (1 kg) and water (10 cc) were charged. Furthermore, an aqueous solution of ammonium hydroxide was added to the autoclave in an amount such that the number of the ammonium group was about 2.5% of all the terminal carboxylic acid groups. Then, the mixture was heated at 230° C. for 2 hours. After drying the polymer, the number of all the terminal carboxylic acid group was measured. The number was 5 per 10$^6$ carbon atoms.

Comparative Example 3

The polymer was heated in the same manner as in Example 3 except that the aqueous solution of ammonium hydroxide was added to the autoclave in an amount such that the number of the ammonium group was about 0.5% of all the terminal carboxylic acid groups.

After drying the polymer, the number of all the terminal carboxylic acid group was measured. The number was 450 per 10$^6$ carbon atoms.

What is claimed is:

1. A melt kneaded tetrafluoroethylene-hexafluoropropylene copolymer containing $1.0 \times 10^{14}$ spins/g or less of unpaired electrons on the carbon atoms in terms of a spin density measured with electron spin resonance at a temperature of 10K and 50 ppm or less of a basic component, having a volatile index (VI) of 25 or less, and having substantially no terminal —COOH, —COF, or —CF=CF$_2$ groups.

2. The melt kneaded tetrafluoroethylene-hexafluoropropylene copolymer according to claim 1, wherein said amount of unpaired electron on the carbon atoms is $1.0 \times 10^{13}$ spins/g or less in terms of a spin density measured with electron spin resonance at a temperature of 10K and 50 ppm or less of a basic component.

3. The melt kneaded tetrafluoroethylene-hexafluoropropylene copolymer according to claim 1 or 2, which is obtained by adding 0.1 to 10% of a compound comprising an alkali metal or an alkaline earth metal in terms of the number of atoms of the alkali metal or the alkaline earth metal based on the total number of the above terminal groups to the tetrafluoroethylene-hexafluoropropylene copolymer, and heating the tetrafluoroethylene-hexafluoropropylene copolymer at a temperature of at least 200° C. in an atmosphere containing moisture while kneading.

4. The melt kneaded tetrafluoroethylene-hexafluoropropylene copolymer according to claim 1, 2 or 3, wherein said flourine-containing copolymer has a melt viscosity of 0.1 to 100 kPa·s at 372° C.

* * * * *